US012596680B2

(12) United States Patent          (10) Patent No.:    US 12,596,680 B2
Behera et al.                          (45) **Date of Patent:        \*Apr. 7, 2026**

(54) FILE TIERING WITH DATA INTEGRITY CHECKS

(71) Applicant: Dell Products L.P., Round Rock, TX (US)

(72) Inventors: Sarat Kumar Behera, Bangalore (IN); Rabi Shankar Shaw, Bangalore (IN); Anurag Bhatnagar, Bangalore (IN); Aditi Singh, Lucknow (IN)

(73) Assignee: Dell Products L.P., Round Rock, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/092,478

(22) Filed: Jan. 3, 2023

(65) Prior Publication Data

US 2024/0220453 A1     Jul. 4, 2024

(51) Int. Cl.
G06F 16/16          (2019.01)
G06F 16/13          (2019.01)

(52) U.S. Cl.
CPC ............ G06F 16/16 (2019.01); G06F 16/137 (2019.01)

(58) Field of Classification Search
CPC ................................ G06F 16/16; G06F 16/137
See application file for complete search history.

(56) References Cited

U.S. PATENT DOCUMENTS

| | | | | |
|---|---|---|---|---|
| 7,865,475 B1 * | 1/2011 | Yadav | ................... | G06F 16/128 |
| | | | | 707/655 |
| 9,323,758 B1 * | 4/2016 | Stacey | ................. | G06F 16/113 |
| 2007/0038816 A1 * | 2/2007 | Hughes | ................... | H04L 12/66 |
| | | | | 711/147 |
| 2014/0188805 A1 * | 7/2014 | Vijayan | ................. | G06F 16/113 |
| | | | | 707/646 |
| 2015/0381725 A1 * | 12/2015 | Haapaoja | ................ | G06F 3/067 |
| | | | | 709/213 |
| 2016/0335308 A1 * | 11/2016 | Dhuse | ................... | G06F 16/235 |
| 2020/0034063 A1 * | 1/2020 | Somasundaram | .. | G06F 9/45558 |

(Continued)

OTHER PUBLICATIONS

Dell EMC, "Dell EMC Cloud Tiering Appliance and Cloud Tiering Appliance/VE," Version 12.1, Getting Started Guide, P/N 300-005-094, Rev 30, Nov. 2019, 139 pages.

(Continued)

*Primary Examiner* — Jensen Hu

(74) *Attorney, Agent, or Firm* — Ryan, Mason & Lewis, LLP

(57)          ABSTRACT

A method comprises computing a first hash value for at least one file of a plurality of files to be tiered in connection with a file tiering operation of the plurality of files from a source storage location to a destination storage location, wherein the file tiering operation comprises tiering of the at least one file to the destination storage location. In the method, the first hash value is compared to a second hash value for the at least one file, wherein the second hash value is computed from data in an object on the destination storage location corresponding to the at least one file. Based at least in part on the comparing, a determination is made whether the first hash value is the same as the second hash value. The tiering of the at least one file to the destination storage location proceeds in response to an affirmative determination.

20 Claims, 10 Drawing Sheets

(56) References Cited

U.S. PATENT DOCUMENTS

| 2020/0034458 | A1* | 1/2020 | Mehta | ................. G06F 16/2255 |
| 2020/0133720 | A1* | 4/2020 | Chinthekindi | ........ G06F 9/4875 |
| 2021/0289043 | A1* | 9/2021 | Brown | ................ G06F 11/3024 |
| 2022/0206901 | A1* | 6/2022 | Ganapathy | .......... G06F 11/1044 |

OTHER PUBLICATIONS

Dell Technologies, "Dell EMC Unity: Cloud Tiering Appliance (CTA)," Technical White Paper, H16376.5, Jun. 2021, 42 pages.
A. Adshead, "Nfs vs SMB vs CIFS: File Storage Protocols Defined," https://www.computerweekly.com/feature/NFS-vs-SMB-vs-CIFS-File-storage-protocols-defined, Oct. 4, 2022, 4 pages.
U.S. Appl. No. 17/972,688 filed in the name of Sarat Kumar Behera et al. on Oct. 25, 2022, and entitled "Deduplication for Cloud Storage Operations.".

* cited by examiner

400

```
glider:/opt/rainfinity/filemanagement/log/fws/support # rffm addFileTask --Type=file_archive --Schedule=daily@06:0
5 --Source=Aditi_sdnas --FilesystemUUID=62ebc5e1-8cf9-9dda-48e1-005056821f29 --ShareName=GliderBot_FS_1 -PolicyUU
ID=f09f954c-70ad-11e8-8298-000c29f70011 --Protocol=cifs --SharePath=/GliderBot_FS_1 --ShareUUID=62ebc7c5-2ac7-e62
5-db37-005056821f29 --TaskUUID=304c4719-84d3-4b96-bd81-93e5b1ea3bf1
File Task added successfully with Id: 4
glider:/opt/rainfinity/filemanagement/log/fws/support #
glider:/opt/rainfinity/filemanagement/log/fws/support #
glider:/opt/rainfinity/filemanagement/log/fws/support # psql -U rffm
psql (13.7)
Type "help" for help.

rffm=> select * from file.task_schedule;
 id |                 uuid                 |              start_time             |  job_type   |            filesystem_uuid
    |           policy_uuid                |          fileserver_uuid             | share_name |  share_p
ath |    str_schedule    | share_export_name | archive_threshold | schedule | run_now | enable | protocol |backupretentionperiod
----+--------------------------------------+-------------------------------------+-------------+--------------------------------------
----+--------------------------------------+--------------------------------------+------------+---------
----+--------------------+-------------------+-------------------+----------+---------+--------+----------+----------------------
  2 | 304c4719-84d3-4b96-bd81-93e5b1ea3bf5 | 2022-08-16 05:43:57.175107 | file_recall | 62ebc5e1-8cf9-9dda-48e1-0
05056821f29 | 62ebc7c5-2ac7-e625-db37-005056821f29 | 62ebc312-338b-d9e9-08be-005056821f29 | DHSM$      | /GliderBo
t_FS_1_1 | f09f954c-70ad-11e8-8298-000c29f70004 | (0,06:05:00) | f       | t      | cifs     |
         | daily@06:05 | GliderBot_FS_1
  4 | 304c4719-84d3-4b96-bd81-93e5b1ea3bf1 | 2022-08-26 05:02:19.7271   | file_archive | 62ebc5e1-8cf9-9dda-48e1-0
05056821f29 | 62ebc7c5-2ac7-e625-db37-005056821f29 | 62ebc312-338b-d9e9-08be-005056821f29 | DHSM$      | /GliderBo
t_FS_1 | f09f954c-70ad-11e8-8298-000c29f70011 | (0,06:05:00) | f       | t      | cifs     |
       | daily@06:05 | GliderBot_FS_1
(2 rows)

rffm=>
```

```
ctal3bm : /mnt/cifs_new # ls -lrth
total 8.0K
drwxr-xr-x  2  root  root  8.0K  Aug   4  06:13  lost+found
drwxr-xr-x  2  root  root   152  Aug   4  06:47  GliderBot_Export_1
dr-xr-xr-x  2  root  bin    152  Aug  16  02:43  .etc
drwxr-xr-x  2  root  root   152  Aug  26  00:55  dir0
ctal3bm:/mnt/cifs_new # cd dir0
ctal3bm:/mnt/cifs_new/dir0 # ls -lrth
total 1.1M
-rw-r--r--  1  root  root  1.0M  Aug  23  04:04  file0.txt
ctal3bm: /mnt/cifs_new/dir0 #
```

```
ctal3bm:/mnt/cifs_new/dir0 # md5sum file0.txt
88e27d4f565ac821cd9753127f3cea  file0.txt
ctal3bm:/mnt/cifs_new/dir0 #
```

Figures 7, 8:
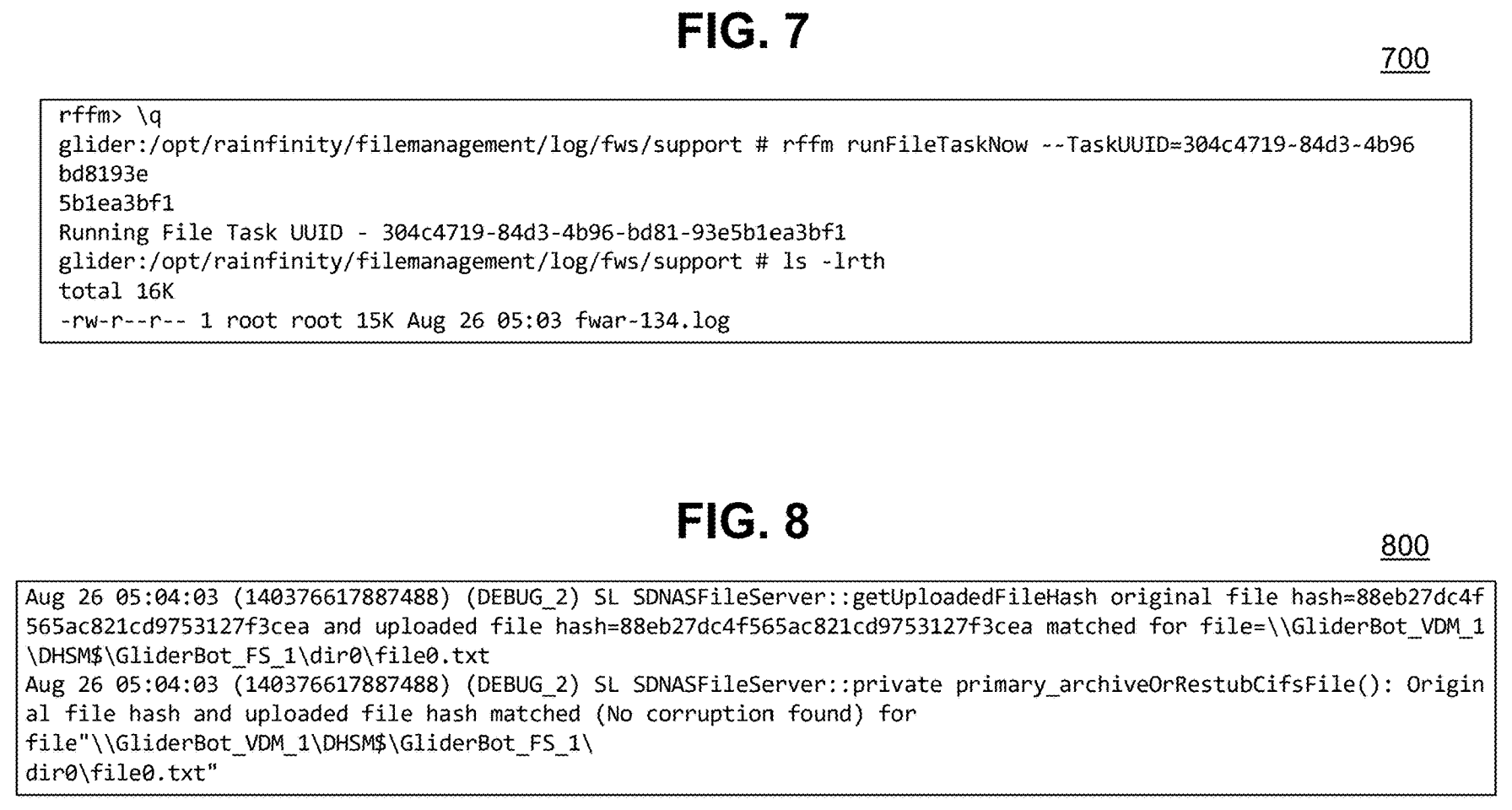

```
rffm> \q
glider:/opt/rainfinity/filemanagement/log/fws/support # rffm runFileTaskNow --TaskUUID=304c4719-84d3-4b96
bd8193e
5b1ea3bf1
Running File Task UUID - 304c4719-84d3-4b96-bd81-93e5b1ea3bf1
glider:/opt/rainfinity/filemanagement/log/fws/support # ls -lrth
total 16K
-rw-r--r-- 1 root root 15K Aug 26 05:03 fwar-134.log
```

```
Aug 26 05:04:03 (14037661787488) (DEBUG_2) SL SDNASFileServer::getUploadedFileHash original file hash=88eb27dc4f
565ac821cd9753127f3cea and uploaded file hash=88eb27dc4f565ac821cd9753127f3cea matched for file=\\GliderBot_VDM_1
\DHSM$\GliderBot_FS_1\dir0\file0.txt
Aug 26 05:04:03 (14037661787488) (DEBUG_2) SL SDNASFileServer::private primary_archiveOrRestubCifsFile(): Origin
al file hash and uploaded file hash matched (No corruption found) for
file"\\GliderBot_VDM_1\DHSM$\GliderBot_FS_1\
dir0\file0.txt"
```

<u>900</u>

```
cta13bm:/mnt/cifs_new # ls -lrth
total 8.0K
drwxr-xr-x 2 root root  8.0K Aug  4 06:13  lost+found
drwxr-xr-x 2 root root   152 Aug  4 06:47  GliderBot_Export_1
dr-xr-xr-x 2 root bin    152 Aug 16 02:43  .etc
drwxr-xr-x 2 root root   152 Aug 26 00:55  dir0
cta13bm:/mnt/cifs_new # cd dir0
cta13bm:/mnt/cifs_new/dir0 # ls -lrth
total 1.1M
-rw-r--r-- 1 root root  1.0M Aug 23 04:04 file0.txt
cta13bm:/mnt/cifs_new/dir0 # md5sum file0.txt
88eb27dc4f565ac821cd9753127f3cea  file0.txt
cta13bm:/mnt/cifs_new/dir0 # ls -lrth
total 8.0K
-rw-r--r-- 1 root root  1.0M Aug 23  04:04  file0.txt
cta13bm:/mnt/cifs_new/dir0 #
```

FIG. 9

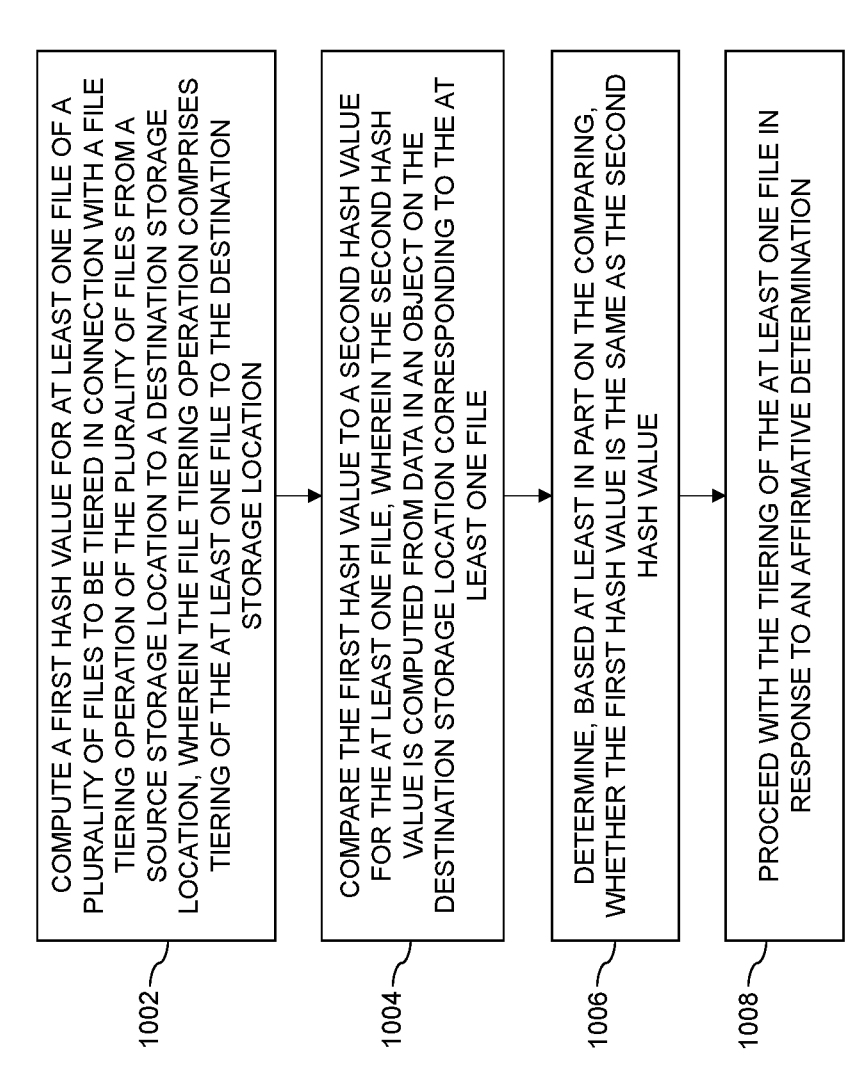

1000

COMPUTE A FIRST HASH VALUE FOR AT LEAST ONE FILE OF A PLURALITY OF FILES TO BE TIERED IN CONNECTION WITH A FILE TIERING OPERATION OF THE PLURALITY OF FILES FROM A SOURCE STORAGE LOCATION TO A DESTINATION STORAGE LOCATION, WHEREIN THE FILE TIERING OPERATION COMPRISES TIERING OF THE AT LEAST ONE FILE TO THE DESTINATION STORAGE LOCATION

1002

COMPARE THE FIRST HASH VALUE TO A SECOND HASH VALUE FOR THE AT LEAST ONE FILE, WHEREIN THE SECOND HASH VALUE IS COMPUTED FROM DATA IN AN OBJECT ON THE DESTINATION STORAGE LOCATION CORRESPONDING TO THE AT LEAST ONE FILE

1004

DETERMINE, BASED AT LEAST IN PART ON THE COMPARING, WHETHER THE FIRST HASH VALUE IS THE SAME AS THE SECOND HASH VALUE

1006

PROCEED WITH THE TIERING OF THE AT LEAST ONE FILE IN RESPONSE TO AN AFFIRMATIVE DETERMINATION

FILE TIERING WITH DATA INTEGRITY CHECKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

In data storage, files that are frequently used and/or critical are generally stored in local or primary storage for fast access. Files that are less frequently used and that do not require the same level of access as the files in local or primary storage can be archived and stored in, for example, low-cost object and cloud storage tiers.

File tiering is an operation in which files are moved from a primary file system to secondary storage. The secondary storage typically includes one or more cloud servers. In doing so, storage space on the primary file system is freed. In some situations, the data that is in cloud storage may be corrupted. Under current approaches, there is no way to retrieve the correct data once the corrupted data has been tiered, resulting in data loss for a user.

SUMMARY

Illustrative embodiments provide techniques for management of cloud storage operations, including techniques to ensure the integrity of data sent to cloud storage.

In one embodiment, a method comprises computing a first hash value for at least one file of a plurality of files to be tiered in connection with a file tiering operation of the plurality of files from a source storage location to a destination storage location, wherein the file tiering operation comprises tiering of the at least one file to the destination storage location. In the method, the first hash value is compared to a second hash value for the at least one file, wherein the second hash value is computed from data in an object on the destination storage location corresponding to the at least one file. Based at least in part on the comparing, a determination is made whether the first hash value is the same as the second hash value. The tiering of the at least one file to the destination storage location proceeds in response to an affirmative determination.

These and other illustrative embodiments include, without limitation, methods, apparatus, networks, systems and processor-readable storage media.

BRIEF DESCRIPTION OF THE DRAWINGS

FIG. 4 depicts example code for adding a scheduled task for tiering according to an illustrative embodiment.

FIG. 5 depicts example code showing a directory containing a file and the file size before running a tiering task according to an illustrative embodiment.

FIG. 6 depicts example code for computing a hash value of a file before tiering the file according to an illustrative embodiment.

FIG. 7 depicts example code for running the tiering task added in FIG. 4 according to an illustrative embodiment.

FIG. 8 depicts example code for showing information about whether computed hash values match and whether the integrity of a file has been maintained according to an illustrative embodiment.

FIG. 9 depicts example code for showing the size of a created stub file and the hash value of the corresponding file according to an illustrative embodiment.

FIG. 10 depicts a process for identifying and preventing corrupted files from being stored in a cloud location according to an illustrative embodiment.

DETAILED DESCRIPTION

Figure 1:
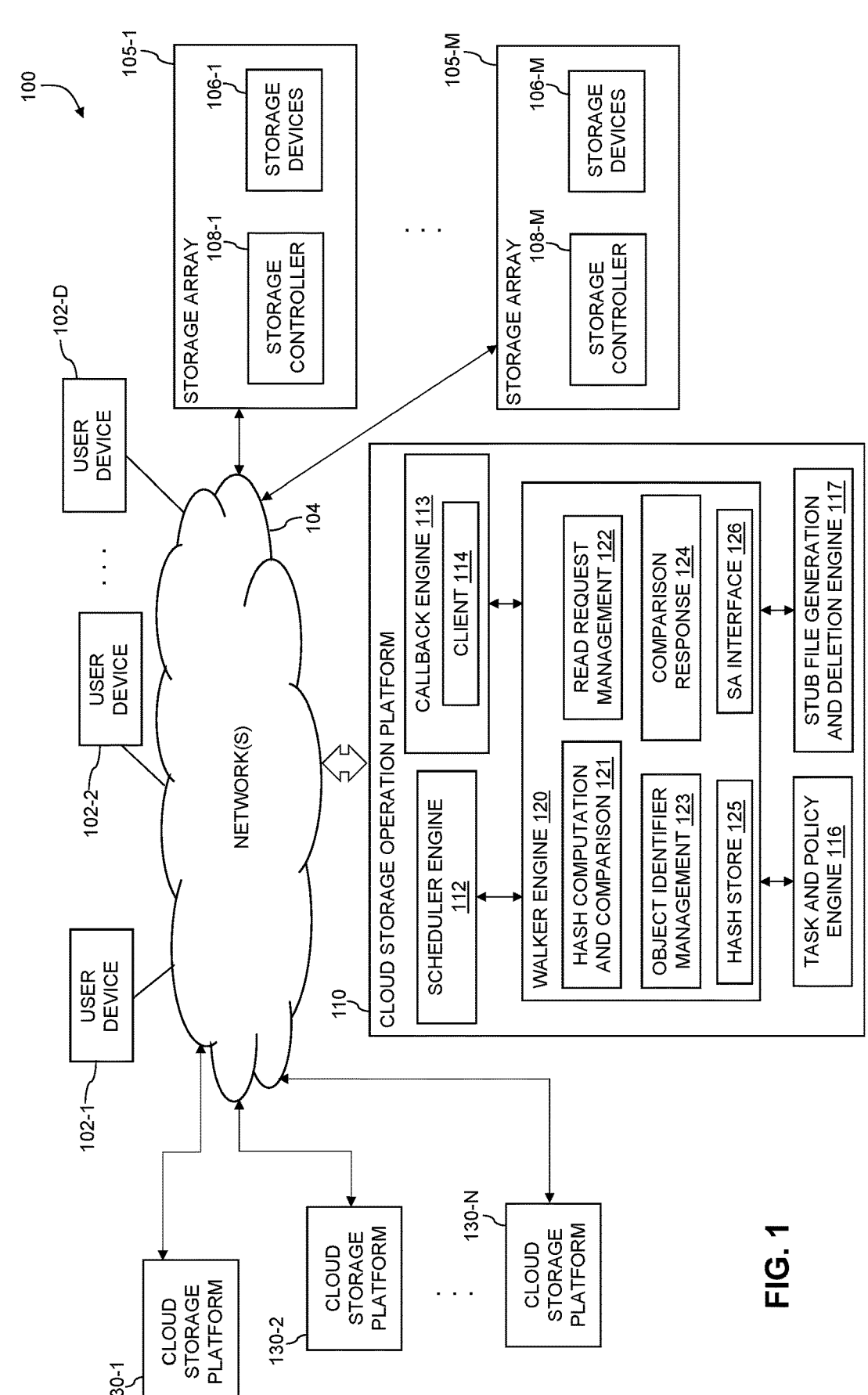
FIG. 1 depicts details of an information processing system with a cloud storage operation platform for identifying and preventing corrupted files from being stored in a cloud location according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "stub file" refers to a file placed in an original file location on a storage device when the original file is archived or tiered to a different location, such as, for example, a cloud storage platform. According to an embodiment, when a stub file is read in an input-output (IO) operation, the IO operation is passed through to the original file located in the archive location, and the original file may be presented to a user as if the original file were in its original location on the storage device. The stub file occupies less memory space ("size on disk") than the original file.

Under conventional techniques, there are problems with ensuring the integrity of files being tiered to a cloud storage location. For example, with current approaches, file data may become corrupted during the tiering process. Once the file is tiered and the original file is deleted from the source storage location, the corrupted file remains in the cloud storage location, and a user is not able to recover the original uncorrupted file data.

Illustrative embodiments provide technical solutions which use hash values to ensure the integrity of data sent to cloud storage. In accordance with the embodiments, if the data in a file is not corrupted, the data passes an integrity check, and a CTA will proceed with and complete the tiering of the file. However, if the data does not pass an integrity check, the CTA will discontinue the tiering of the file without forming a stub file in a source storage location. Advantageously, in illustrative embodiments, a first hash value of an entire file that is to be tiered is computed. Once the file data has been written to an object in the cloud storage location, the object data is read from the cloud, and a second hash value corresponding to the object data is computed. If the first and second hash values match, a stub file is created for the original file and the file is removed from the source storage location to complete tiering of the file. However, if the first and second hash values do not match, no stub file will be formed and the tiering operation for that file will not continue.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a cloud storage operation platform 110. A non-limiting example of a cloud storage operation platform 110 comprises a cloud tiering appliance (CTA), but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108. A non-limiting example of a storage array 105 comprises software-defined network attached storage (SDNAS).

The user devices 102 can comprise, for example, Internet of Things (IoT) devices, desktop, laptop or tablet computers, mobile telephones, or other types of processing devices capable of communicating with the cloud storage operation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud storage operation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud storage operation platform 110, as well as to support communication between the cloud storage operation platform 110 and connected devices (e.g., user devices 102) and/or other related systems and devices not explicitly shown.

Users may refer to customers, clients and/or administrators of computing environments for which file tiering operations such as, for example, archiving and/or backing up are being performed. For example, in some embodiments, the user devices 102 are assumed to be associated with repair technicians, system administrators, information technology (IT) managers, software developers, release management personnel or other authorized personnel configured to access and utilize the cloud storage operation platform 110.

The cloud storage operation platform 110 of the system 100 is configured to move data between the storage arrays 105 and one or more cloud storage platforms 130-1, 130-2, . . . 130-N, collectively referred to herein as cloud storage platforms 130. The cloud storage operation platform 110 is also configured to move data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The cloud storage operation platform 110 is configured to move data, for example, by moving data files, snapshots or other data objects in and between the user devices 102, the storage arrays 105 and the cloud storage platforms 130. A given data object (also referred to herein as an "object") may comprise a single data file, or multiple data files. According to one or more embodiments, the cloud storage operation platform 110 permits administrators to automatically move data in and between the user devices 102, the storage arrays 105 and the cloud storage platforms 130 based on user-configured policies. The cloud storage platforms 130 include, for example, Dell® EMC® Elastic Cloud Storage (ECS), Microsoft® Azure®, Amazon® S3, and/or IBM® Cloud Object Storage (COS) platforms, or other available cloud infrastructures.

The cloud storage operation platform 110 in the present embodiment is assumed to be accessible to the user devices 102, and vice-versa, over the network 104. In addition, the cloud storage operation platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cloud storage operation platform 110, on behalf of respective infrastructure tenants each corresponding to one or more users associated with respective ones of the user devices 102 provides a platform for identifying and preventing corrupted files from being stored in a cloud location. Referring to FIG. 1, the cloud storage operation platform 110 comprises a scheduler engine 112, a callback engine 113, a task and policy engine 116, a stub file generation and deletion engine 117 and a walker engine 120. The callback engine 113 comprises a client component 114. An example of a callback engine 113 comprises a callback daemon such as, for example, an Atmos Callback Daemon (ACD) and/or a Celerra Callback Daemon (CCD). The client component 114 can be, for example, an ACD and/or CCD client. The walker engine 120 comprises a hash computation and comparison layer 121, a read request management layer 122, an object identifier management layer 123, a comparison response layer 124, a hash store 125 and a storage array (SA) interface layer 126.

The cloud storage operation platform 110 in some embodiments comprises configurable data mover modules adapted to interact with the user devices 102, the storage arrays 105 and the cloud storage platforms 130. At least one configuration file is implemented in or otherwise associated with the cloud storage operation platform 110. The state of the configuration file may be controlled at least in part by a job scheduler implemented as part of the scheduler engine 112 of the cloud storage operation platform 110. The job scheduler interacts with the task and policy engine 116. For example, once a tiering task and corresponding policies (e.g., types of files to be tiered) have been specified by, for example, a user via one of the user devices 102, the task and policies are provided to the scheduler engine 112 and/or walker engine 120 from the task and policy engine 116. The policies and their constraints are used by the scheduler engine 112 and/or walker engine 120 as a filter to select files which are to be tiered. The scheduler engine 112 schedules file tiering tasks and communicates with the storage arrays 105 to retrieve lists of files to be tiered based on the specified policies from the task and policy engine 116. For example, referring to the operational flow diagram 300 in FIG. 3, at block 351, a scheduler of a CTA 310 (e.g., scheduler engine 112 of cloud storage operation platform 110) spawns a tiering task at a scheduled time and, at block 352, the walker engine 120 creates FileServer factory, PolicyEvaluator and CloudAdaptor components to apply tiering policies, retrieve files complying with the policies and interface with cloud storage platforms to create objects corresponding to the files on the cloud storage platforms 130. In more detail, File-server Factory is an object for a file server which includes identifying and protocol information associated with the file server. This object is used for making a connection to the file server and to perform operations. The PolicyEvaluator evaluates files and determines whether the files are eligible for tiering. For example, if a user created a policy like "tier all files whose size is greater than 5 GB," then the PolicyEvaluator evaluates the files against the size condition. The CloudAdaptor is responsible for cloud related operations such as, for example, creating an object in the cloud which writes the data on a cloud storage platform 130.

FIG. 4 depicts example code 400 for adding a scheduled task for tiering. For example, the task is added using the following command:

```
rffm addFileTask --TaskUUID=df4a0bfe-841f-4edc-b0d8-d94072a92412
--Type=file_archive --Schedule-daily@06:05 --Source-aditi_sdnas
--FilesystemUUID-6155c3b4-78d0-3420-1865-005056821f29
--ShareUUID=6155c4c0-3bef-a6cd-58b9-005056821f29
--ShareName=GliderBot_FS_1 --SharePath=/GliderBot_FS_1
--PolicyUUID=f09f954c-70ad-11e8-8298-000c29f70004 --Protocol=cifs
```

As can be seen, the command specifies a task universal unique identifier (UUID), a type of task, a scheduled time for the task to run, a source storage location, a file system UUID, a share UUID, a share name, a share path, a policy UUID and a file access storage protocol. FIG. 7 depicts example code 700 for running the tiering task added in FIG. 4.

Figure 3:
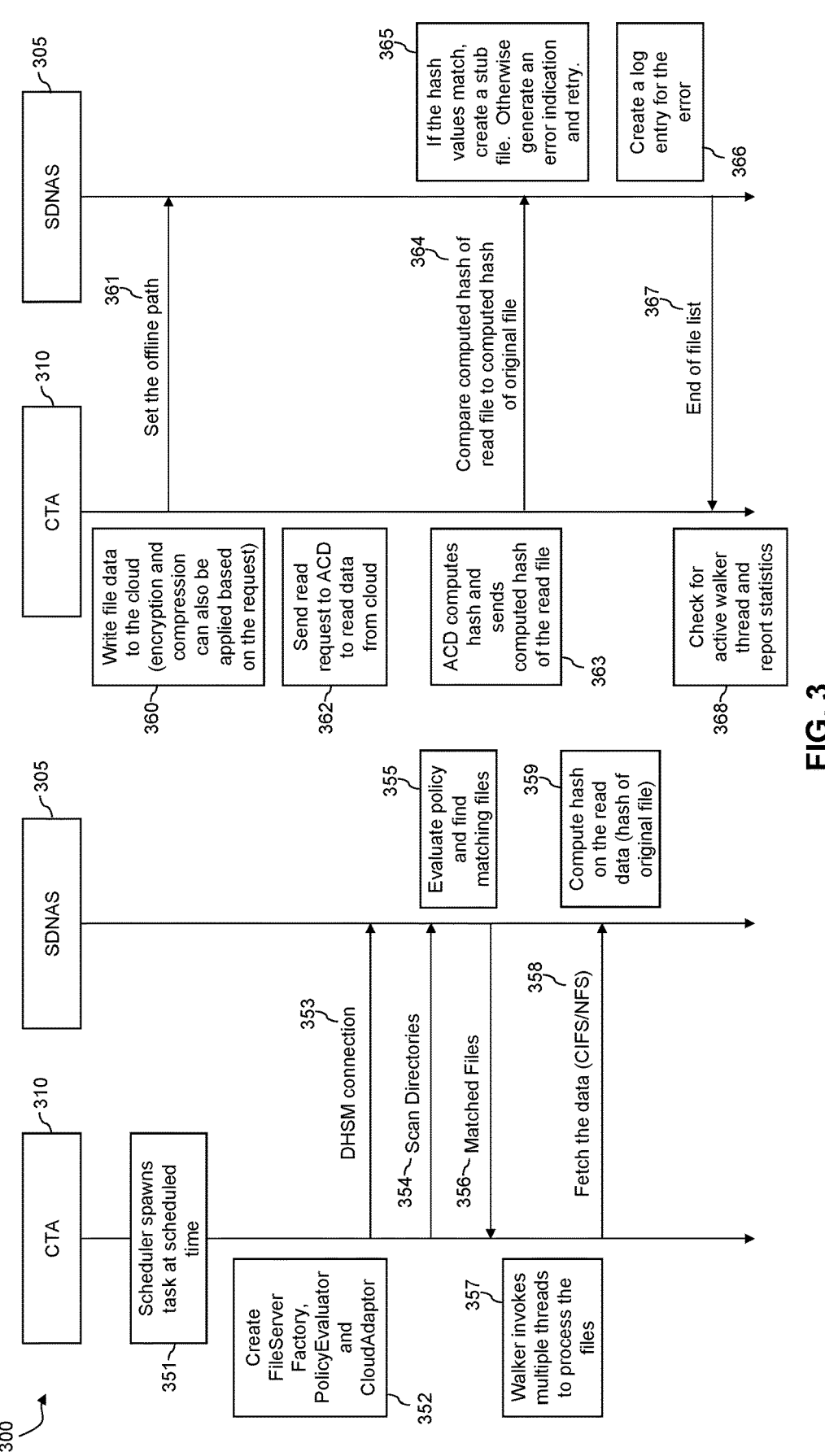
FIG. 3 depicts an operational flow diagram illustrating operations between a cloud tiering appliance (CTA) and software-defined network attached storage (SDNAS) in connection with implementing data integrity checks for a file tiering operation according to an illustrative embodiment.

In connection with step 353 in FIG. 3, a connection to a Distributed Hierarchical Storage Management (DHSM) application programming interface (API) is established. In an illustrative embodiment, a DHSM API is on a storage array 105 (e.g., SDNAS 305) and enables file stubbing and recall of tiered files. In some embodiments, the CTA 310 enables DHSM in a server of the SDNAS 305 as part of a first run of the tiering task. Referring to FIG. 1, the storage array (SA) interface layer 126 includes one or more APIs for interfacing with the storage array 105 (e.g., SDNAS 305) and the DHSM API.

In connection with steps 354, 355 and 356, directories of one or more of the storage arrays 105 (e.g., SDNAS 305) are scanned for the files to be tiered by evaluating the policies (e.g., with PolicyEvaluator) and retrieving the matching files. FIG. 5 depicts example code 500 showing a directory containing a file (file0.txt) and the file size (1.0 MB) before running a tiering task.

The matched files are sent to the CTA 310 (e.g., cloud storage operation platform 110). Tasks may start at a scheduled time that can be pre-configured or user-specified via one or more user interfaces. Upon receipt of the relevant files (e.g., files matching the policies) from one or more of the storage arrays 105, referring to block 357, the walker engine 120 invokes multiple threads to process the files for data integrity checks as described in more detail herein below.

The cloud storage operation platform 110 can include at least one API that permits an external component to control selection between various modes of operation. One or more external components can access the configuration file via such an API in order to control a mode of operation of the cloud storage operation platform 110. For example, an application running on one or more of the user devices 102 can access the configuration file via the API in order to control the mode of operation of the cloud storage operation platform 110.

In some embodiments, the cloud storage operation platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the cloud storage operation platform 110 in different modes of operation without the use of a configuration file. Thus, such a configuration file should not be viewed as a requirement.

The cloud storage operation platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130. A given data mover module can be implemented at least in part on storage arrays 105 or other storage platforms that implement at least portions of one or more storage tiers of the multi-tier storage system.

In one or more embodiments, the cloud storage operation platform 110 can be used to tier file data and archive block data to the cloud storage platforms 130, and to recall file data and restore block data to the storage arrays 105 from the cloud storage platforms 130. In some embodiments, the cloud storage operation platform 110 can be used to migrate repositories between cloud storage platforms 130, storage arrays and/or user devices 102.

In a file tiering process (also referred to herein as "cloud tiering"), the task and policy engine 116 is configured to identify files that fit an administrator-defined criteria, and the cloud storage operation platform 110 initiates movement of the identified files to a cloud storage platform 130. The stub file generation and deletion engine 117 creates a stub file in the original file location on, for example, the storage array 105 or the user device 102. According to an embodiment, when the stub file is read, the cloud storage operation platform 110 recalls or passes an IO operation via the callback engine 113 through to an object for the original file located in the cloud storage platform 130, and the original file may be presented to a user as if the original file were in its original location on the storage array 105 or user device 102. Stub files comprise information (e.g., object identifiers (OIDs)) about destinations in the cloud storage platforms

130 where the files corresponding to the stub files are located. As noted herein, however, with conventional approaches, the file data may be corrupted during the file tiering process, such that the cloud object may contain corrupted data instead of the original uncorrupted file data. The illustrative embodiments advantageously prevent tiering when it will result in cloud objects comprising corrupted data and loss of the original file data.

In a file tiering operation, files are moved from a primary (e.g., source) file system (e.g., storage array 105) to secondary (e.g., target) storage (e.g., cloud storage platform 130). In doing so, storage space on the primary file system is freed up, leaving the stub files, which are typically small files (e.g., 8 KB or 10 KB), and which include necessary information to access the tiered files from secondary storage. Tiering appliances (e.g., CTAs) like the cloud storage operation platform 110, run scheduled jobs to move the files from a primary file system and tier them to a cloud storage platform 130. As noted above, the files to be tiered may be selected based on one or more policies.

In an operation referred to as, for example, recall or rehydration, a user accesses the stub files or runs a recall task (via, for example, the task and policy engine 116), so that the cloud storage operation platform 110 retrieves the tiered files from one or more cloud servers of one or more cloud storage platforms 130 to be downloaded (e.g., rehydrated) back to the primary file system.

According to illustrative embodiments, in connection with blocks 354-356 in FIG. 3, the CTA 310 (or cloud storage operation platform 110) scans, for example, files in the SDNAS 305 (or storage array 105) and applies policies to each file. If there are multiple policies, the multiple policies are applied to a given file until a rule evaluates to "true," and then takes the action associated with the rule, such as, for example, "tier" or "don't tier." Some examples of policies governing whether files are tiered may be based on one or more constraints such as, for example, when a file was last accessed or modified, when file attributes were last changed, and/or a size of a file (e.g., >10 MB). Policies may also be based on file names (e.g., only tier files having certain names or parts of names) and/or directory name (e.g., only tier files from specified directories or from directories having certain names or parts of names).

Figure 2:
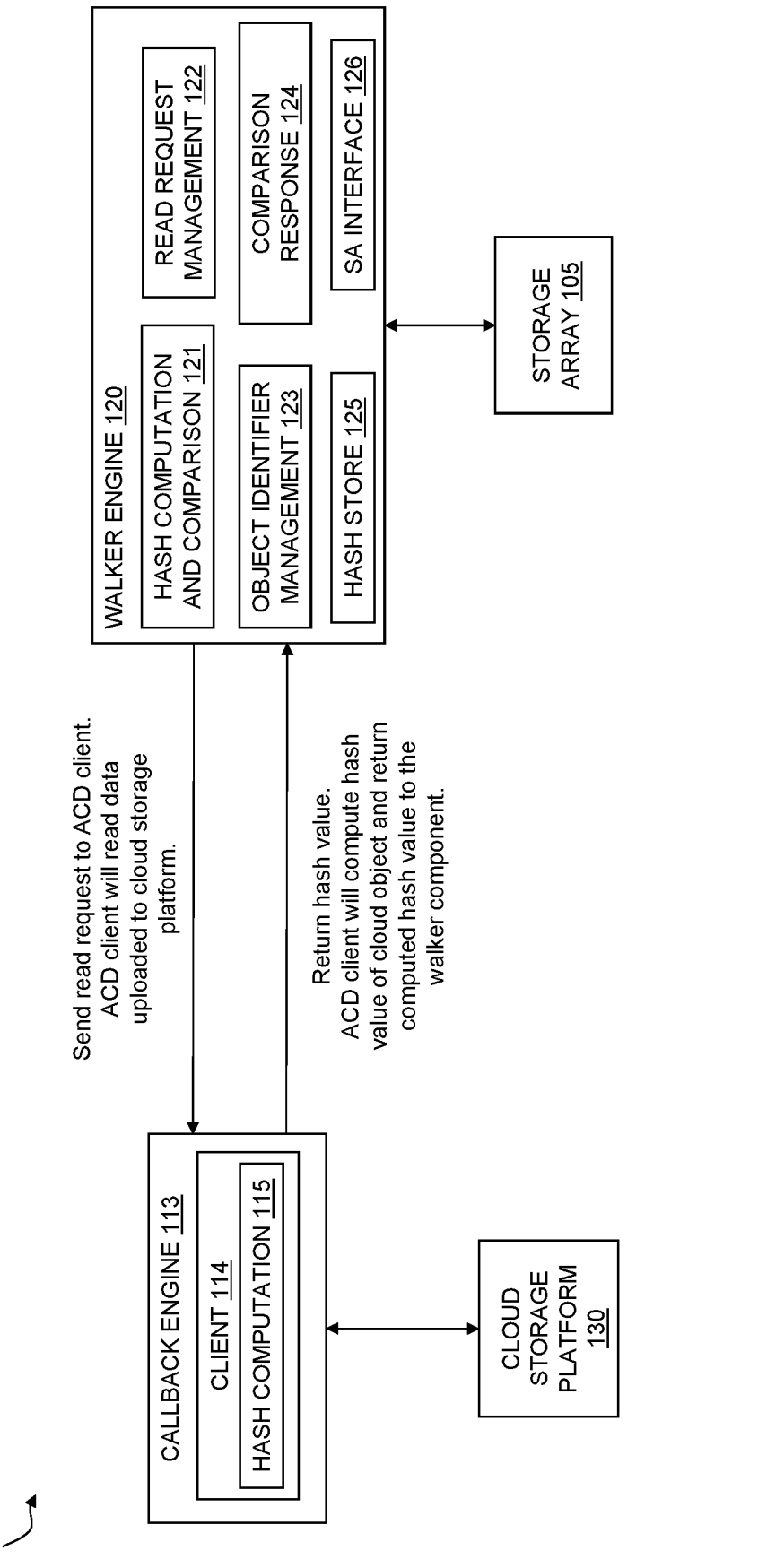
FIG. 2 depicts details of an architecture and state diagram illustrating callback and walker engines for implementing data integrity checks for a file tiering operation according to an illustrative embodiment.

Referring to the information processing system 100 in FIG. 1, the architecture and state diagram 200 in FIG. 2 and the operational flow diagram 300 in FIG. 3, the callback engine 113 and walker engine 120 use hash values to ensure the integrity of data sent to cloud storage, and avoid creation of stub files pointing to cloud objects comprising corrupted data. For example, in connection with a file tiering operation, referring to step 358, one or more file access storage protocols (e.g., network file system (NFS), server message block (SMB) and/or common internet file system (CIFS)) are used to access the data of the matched files from the storage arrays 105 (e.g., SDNAS 305). Referring to step 359, in connection with a given file of the matched files, a first hash value for the given file is computed by the hash computation and comparison layer 121. In accordance with an illustrative embodiment, in order to compute the first hash value, the hash computation and comparison layer 121 computes respective hash values for respective ones of a plurality of data chunks of the given file, and combines the respective hash values to yield the first hash value. In more detail, data chunks of a file are read, and the hash values of the file data chunks are computed. At the end of the file data, the hash of the complete file is computed based, at least in part, on the hash values of the file data chunks. For example, md5sum, sha256 or other hashing algorithms can be used to compute the hash values of the file data chunks and the hash of the complete file (e.g., first hash value). FIG. 6 depicts example code 600 for using md5sum to compute a hash value of a file (88eb27dc4f565ac821cd9753127f3cea) before tiering the file (file0.txt).

In illustrative embodiments, as file data chunks are read, the respective hash values of the data chunks are computed before writing of the respective ones of the plurality of data chunks to one or more objects on a cloud storage platform 130. As a result, the first hash value represents the data in the file before it has been sent to and written to an object in the cloud storage platform 130. For example, referring to block 360 in FIG. 3, the file data is written to the cloud after computation of hash values (block 359). As per block 360, after the first hash value for a given file is computed, encryption and/or compression may be applied to the file data when uploading the data to the cloud storage platform 130. Referring to block 361 of FIG. 3, an offline path is set. An offline path indicates a path where the tiered data is present in the cloud. Once a stub file is created, the offline path is specified in the stub file so that when a cloud storage operation platform 110 (e.g., CTA 310) needs to recall data from a cloud storage platform 130, the cloud storage operation platform 110 knows from where to retrieve the tiered data.

Once the data for the given file has been written to one or more objects on the cloud storage platform 130, referring to FIG. 2 and to block 362 of FIG. 3, the read request management layer 122 sends a request for a second hash value for the given file to the callback engine 113, which as noted herein above, comprises a callback daemon. The request comprises a read request for the data for the given file in the one or more objects on the cloud storage platform 130. The request includes an OID indicating the one or more objects corresponding to the given file. The OID further indicates that the request corresponds to a data integrity check. The object identifier management layer 123 generates an OID indicating that the request corresponds to a data integrity check, which ensures that the read request does not return the object data to the walker engine 120, and instead causes the callback engine 113 to read the data for the given file from the one or more objects, compute the second hash value from the read data and return the computed second hash value to the walker engine 120. In more detail, a client component 114 (e.g., ACD or CCD client) of the callback engine 113 includes a hash computation layer 115. The client component 114 reads the data for the given file from the one or more objects in the cloud storage platform 130 and computes the second hash value from the read data using, for example, md5sum, sha256 or other hashing algorithms. Then, referring to FIG. 2 and block 363 of FIG. 3, the client component 114 sends the computed second hash value to the walker engine 120. The read request is sent to the callback engine 113 before the creation of any stub files for the given file in the storage array 105 (or SDNAS 305) and before deletion of the given file from the storage array 105 (or SDNAS 305).

Upon receipt of the computed second hash value, referring to step 364 of FIG. 3, the hash computation and comparison layer 121 of the walker engine 120 compares the first hash value to the second hash value for the given file to determine whether the first hash value is the same as the second hash value. Referring to block 365 of FIG. 3, if the hash computation and comparison layer 121 determines that the first and second hash values for the given file match (e.g., are the same), then the comparison response layer 124 proceeds with the tiering of the given file by deleting the given file from the storage array 105 (e.g., SDNAS 305) and the stub file generation and deletion engine 117 creates a stub file for the given file pointing to the one or more objects on the cloud storage platform 130 corresponding to the given file. First and second hash values that are the same indicates, for example, that there has been no data corruption and that the data of the given file from a source location (e.g., storage array 105) matches with the data in the object(s) at the target storage location (e.g., cloud storage platform 130) for the given file. FIG. 8 depicts example code 800 for showing information about whether computed hash values match and whether the integrity of a file has been maintained. For example, the code 800 in FIG. 8 indicates that the first and second hashes (e.g., original file hash and uploaded file hash) for file0.txt match, and no corruption has been found. FIG. 9 depicts example code 900 for showing the size of a created stub file (8.0 KB) and the hash value (88eb27dc4f565ac821cd9753127f3cea) of the corresponding file.

Alternatively, referring to block 365, if the hash computation and comparison layer 121 determines that the first and second hash values for the given file do not match (e.g., are different from each other), then the comparison response layer 124 discontinues the tiering of the given file. In the case of different first and second hash values, the comparison response layer 124 causes deletion of the one or more objects from the cloud storage platform 130 corresponding to the given file. First and second hash values that are different indicates, for example, that there has been data corruption and that the data of the given file from a source location (e.g., storage array 105) does not match with the data in the object(s) at the target storage location (e.g., cloud storage platform 130) for the given file. Referring to blocks 365 and 366, in response to determining that the first and second hash values are different from each other, the comparison response layer 124 generates a log entry indicating data corruption of the given file or some other indication of an error. In illustrative embodiments, the walker engine 120 retries the tiering of the given file in another instance of a file tiering operation and/or another file tiering operation.

The log entry may be stored in, for example, a stub hard link database (SHLDB). The SHLDB can be created in a hidden directory within each file system. When a file is stubbed, a UUID is generated to track the stub file for its lifetime in the SHLDB. When a cloud storage operation platform 110 (e.g., CTA 310) tiers a file of a storage array 105 (e.g., SDNAS 305) and marks it as stubbed, a corresponding hard link entry will be created in the SHLDB. Since it is a hard link, any change in the SHLDB entry will be reflected in the corresponding stub file in the storage array 105 (e.g., SDNAS 305).

While the embodiments are discussed in terms of a given file to be tiered, it is to be understood that the steps described herein in connection with FIGS. 1-3 are performed for respective ones of a plurality of files to be tiered from a source storage location (e.g., storage array 105, SDNAS 305, etc.) to a target storage location (e.g., cloud storage platform 130). In more detail, first and second hash values of respective ones of a plurality of files are computed and compared to determine whether there has been data corruption for any of the files and whether tiering of the respective files should be completed or discontinued. For example, at step 367, the walker engine 120 determines whether an end of a list of files to be tiered in a given tiering operation has been reached. If not, then the process returns, for example, to step 358 or 359 to repeat the process for the next file in the file tiering operation. If an end of the list of files to be tiered has been reached, then at step 368, the walker engine 120 checks for any other active walker threads and generates a report of the statistics of the tiering operation including, for example, successful tiering of files (e.g., matching first and second hash values) or unsuccessful tiering of files (e.g., different first and second hash values). Such a report may be accessed by one or more users via, for example, user devices 102.

In illustrative embodiments, the first hash values of respective ones of a plurality of files to be tiered are stored in the hash store 125 (also referred to as a "database" herein) upon computation of the first hash value. Following the determining of whether the first hash value is the same as the second hash value, the first hash values of the respective ones of the plurality of files are deleted from the hash store 125.

According to one or more embodiments, the hash store 125 or other databases used herein can be configured according to a relational database management system (RDBMS) (e.g., PostgreSQL). The hash store 125 or other databases in some embodiments are implemented using one or more storage systems or devices associated with the cloud storage operation platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud storage operation platform 110, the scheduler engine 112, callback engine 113, the task and policy engine 116, the stub file generation and deletion engine 117 and walker engine 120, in other embodiments can be implemented at least in part externally to the cloud storage operation platform 110, for example, as stand-alone servers, sets of servers or other types of systems coupled to the network 104. For example, the scheduler engine 112, callback engine 113, the task and policy engine 116, the stub file generation and deletion engine 117 and walker engine 120 may be provided as cloud services accessible by the cloud storage operation platform 110.

The scheduler engine 112, callback engine 113, the task and policy engine 116, the stub file generation and deletion engine 117 and walker engine 120 in the FIG. 1 embodiment are each assumed to be implemented using at least one processing device. Each such processing device generally comprises at least one processor and an associated memory, and implements one or more functional modules for controlling certain features of the scheduler engine 112, callback engine 113, the task and policy engine 116, the stub file generation and deletion engine 117 and/or walker engine 120.

At least portions of the cloud storage operation platform 110 and the components thereof may be implemented at least in part in the form of software that is stored in memory and executed by a processor. The cloud storage operation platform 110 and the components thereof comprise further hardware and software required for running the cloud storage operation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the scheduler engine 112, callback engine 113, the task and policy engine 116, the stub file generation and deletion engine 117, walker engine 120 and other components of the cloud storage operation platform 110 in the present embodiment are shown as part of the cloud storage operation platform 110, at least a portion of the scheduler engine 112, callback engine 113, the task and policy engine 116, the stub file generation and deletion engine 117, walker engine 120 and other components of the cloud storage operation platform 110 in other embodiments may be implemented on one or more other processing platforms that are accessible to the cloud storage operation platform 110 over one or more networks. Such components can each be implemented at least in part within another system element or at least in part utilizing one or more stand-alone components coupled to the network 104.

It is assumed that the cloud storage operation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the scheduler engine 112, callback engine 113, the task and policy engine 116, the stub file generation and deletion engine 117, walker engine 120 and other components of the cloud storage operation platform 110, and the elements thereof can each be implemented in the form of one or more LXCs running on one or more VMs. Other arrangements of one or more processing devices of a processing platform can be used to implement the scheduler engine 112, callback engine 113, the task and policy engine 116, the stub file generation and deletion engine 117, walker engine 120, as well as other components of the cloud storage operation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cloud storage operation platform 110 to reside in different data centers. Numerous other distributed implementations of the cloud storage operation platform 110 are possible.

Accordingly, one or each of the scheduler engine 112, callback engine 113, the task and policy engine 116, the stub file generation and deletion engine 117, walker engine 120 and other components of the cloud storage operation platform 110 can each be implemented in a distributed manner so as to comprise a plurality of distributed components implemented on respective ones of a plurality of compute nodes of the cloud storage operation platform 110.

It is to be appreciated that these and other features of illustrative embodiments are presented by way of example only, and should not be construed as limiting in any way.

Accordingly, different numbers, types and arrangements of system components such as the scheduler engine 112, callback engine 113, the task and policy engine 116, the stub file generation and deletion engine 117, walker engine 120 and other components of the cloud storage operation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud storage operation platform can be offered to cloud infrastructure customers or other users as part of FaaS, CaaS and/or PaaS offerings.

The operation of the information processing system 100 will now be described in further detail with reference to the flow diagram of FIG. 10. With reference to FIG. 10, a process 1000 for identifying and preventing corrupted files from being stored in a cloud location as shown includes steps 1002 through 1008, and is suitable for use in the system 100 but is more generally applicable to other types of information processing systems comprising a cloud storage operation platform configured for ensuring data integrity in connection with file tiering operations.

In step 1002, a first hash value is computed for at least one file of a plurality of files to be tiered in connection with a file tiering operation of the plurality of files from a source storage location to a destination storage location. The file tiering operation comprises tiering of the at least one file to the destination storage location, wherein the destination storage location comprises a cloud storage platform.

In step 1004, the first hash value is compared to a second hash value for the at least one file, wherein the second hash value is computed from data in an object on the cloud storage platform corresponding to the at least one file. In illustrative embodiments, the second hash value is requested from a callback daemon. The request comprises a read request for the data in the object on the cloud storage platform, and an OID indicating that the request corresponds to a data integrity check. The callback daemon reads the data in the object on the cloud storage platform and computes the second hash value.

In step 1006, based at least in part on the comparing, it is determined whether the first hash value is the same as the second hash value, and in step 1008, the tiering of the at least one file proceeds in response to an affirmative determination. The process further includes causing generation of a stub file for the at least one file on the source storage location in response to the affirmative determination, and causing deletion of the at least one file from the source storage location in response to the affirmative determination.

In response to a negative determination, the tiering of the at least one file is discontinued. The process further includes causing deletion of the object on the cloud storage platform corresponding to the at least one file, and generating a log entry indicating data corruption of the at least one file in response to the negative determination. In illustrative embodiments, in further response to a negative determination, the tiering of the at least one file is retried in at least one of another instance of the file tiering operation and another file tiering operation.

In one or more embodiments, the computing of the first hash value includes computing respective hash values for respective ones of a plurality of data chunks of the at least one file, and wherein the first hash value is based at least in part on a combination of the respective hash values. The respective hash values for the respective ones of the plurality of data chunks are computed before writing of the respective ones of the plurality of data chunks to the object on the cloud storage platform.

In illustrative embodiments, the first hash value is stored in a database, and is deleted from the database following the determining of whether the first hash value is the same as the second hash value.

It is to be appreciated that the FIG. 10 process and other features and functionality described above can be adapted for use with other types of information systems configured to identify and prevent corrupted files from being stored in a cloud location in connection with file tiering operations.

The particular processing operations and other system functionality described in conjunction with the flow diagram of FIG. 10 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud storage operation platform as disclosed herein can provide a number of significant advantages relative to conventional arrangements. For example, unlike conventional techniques, the embodiments advantageously ensure that the integrity of files is maintained during tiering and hence that data written to the cloud is not corrupted. The embodiments provide a technical solution which calculates the hash value of an original file and compares the hash value of the original with the hash value of uploaded object. As a result, the embodiments advantageously check end-to-end integrity even when the data is modified during the file tiering process because of encryption and/or compression engines. Using this approach, the techniques of the illustrative embodiments prevent data loss due to corruption.

Advantageously, the embodiments send a read request to a callback daemon before creating a stub file. The read request is sent with an OID indicating that the request is to check for data integrity. This OID ensures that the read request does not return the data to the tiering job, and instead causes the callback daemon to read the data from a cloud object and return a computed hash value based on the data in the cloud object. After receiving the computed object hash value from the callback daemon, a CTA compares it with an original file hash value. If the hash values match, the CTA continues with stub file creation to successfully complete tiering of the file. If the hash values do not match, an error response is generated indicating data corruption and a rollback mechanism is executed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud storage operation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud storage operation platform in illustrative embodiments. These and other cloud-based systems in illustrative embodiments can include object stores.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
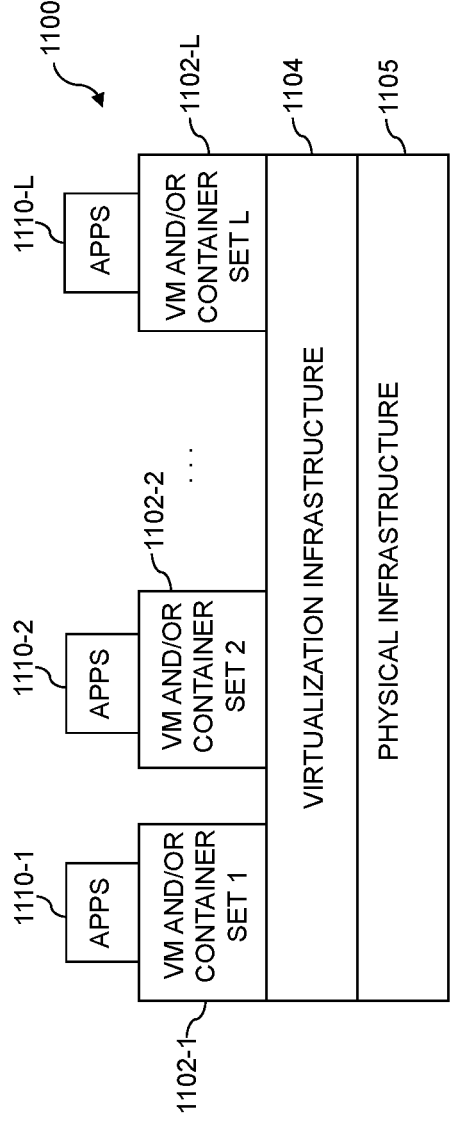
FIGS. 11 and 12 show examples of processing platforms that may be utilized to implement at least a portion of an information processing system according to illustrative embodiments.

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

Figure 12:
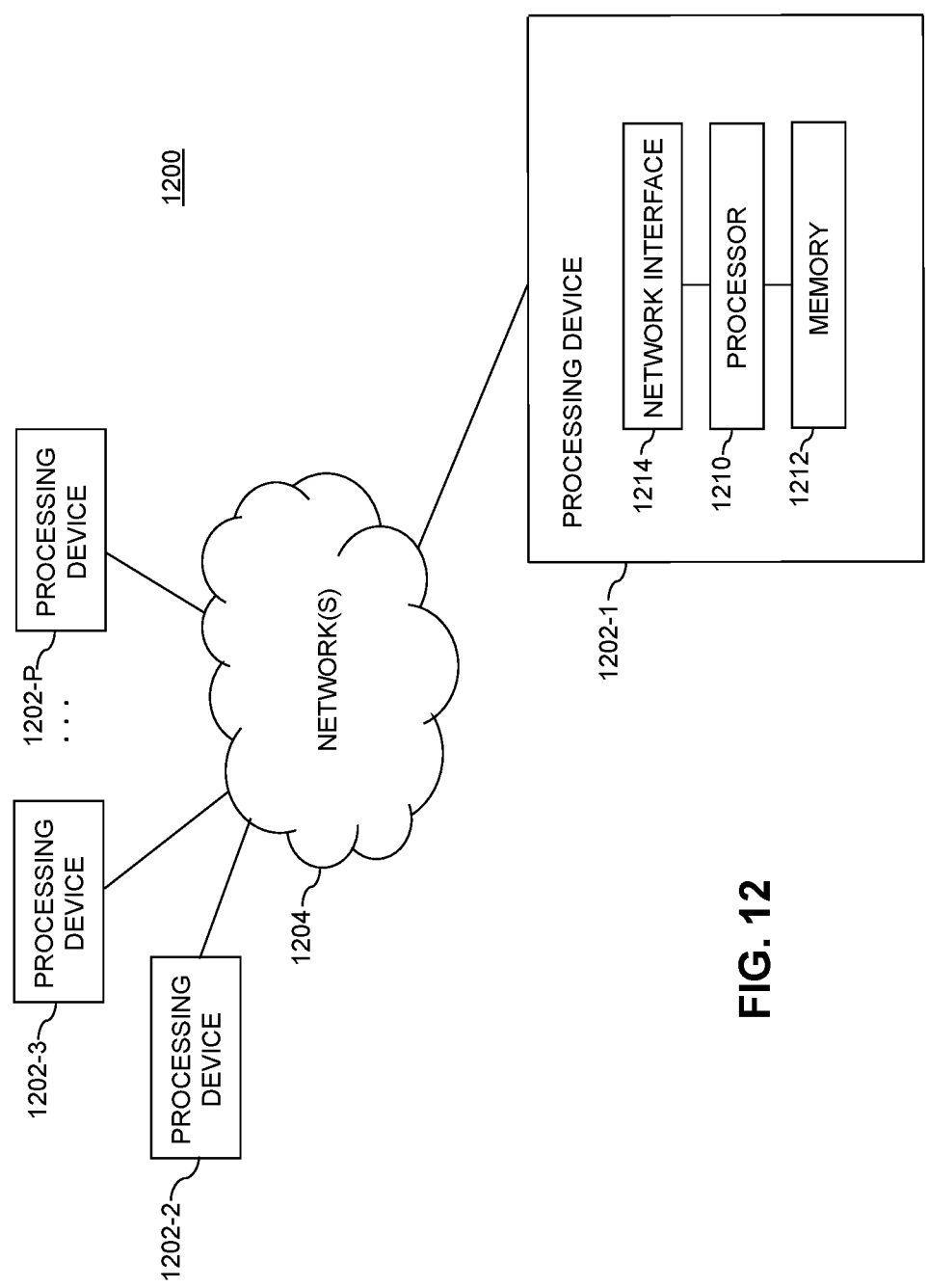

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-P, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It is to be appreciated that steps/operations that are described as being performed by a processing platform can be directly performed by the processing platform and/or the processing platform can cause the step/operation to be performed by another component by the processing platform sending one or more instructions or messages to the other component.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud storage operation platform 110 as disclosed herein are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processing device;
said at least one processing platform being configured:
to compute, by executing one or more hashing algorithms, a first hash value for at least one file of a plurality of files to be tiered in connection with a file tiering operation of the plurality of files from a source storage location to a destination storage location, wherein computing the first hash value comprises computing a plurality of intermediate hash values for a plurality of data chunks of the at least one file, wherein the file tiering operation comprises writing the plurality of data chunks of the at least one file to an object on the destination storage location in response to computing the plurality of intermediate hash values;
to compare the first hash value to a second hash value for the at least one file, wherein the second hash value is computed from data in the object on the destination storage location corresponding to the at least one file;
to determine, based at least in part on the comparing, whether the first hash value is the same as the second hash value, wherein the first hash value and the second hash value are determined to be the same when the first hash value and the second hash value match; and
to proceed with tiering of the at least one file in response to an affirmative determination.

2. The apparatus of claim 1 wherein said at least one processing platform is further configured to cause generation of a stub file for the at least one file on the source storage location in response to the affirmative determination.

3. The apparatus of claim 2 wherein said at least one processing platform is further configured to cause deletion of the at least one file from the source storage location in response to the affirmative determination.

4. The apparatus of claim 1 wherein said at least one processing platform is further configured to cause deletion of the object from the destination storage location corresponding to the at least one file in response to a negative determination.

5. The apparatus of claim 1 wherein said at least one processing platform is further configured to generate a log entry indicating data corruption of the at least one file in response to a negative determination.

6. The apparatus of claim 1 wherein, in response to a negative determination, said at least one processing platform is further configured to retry the tiering of the at least one file in at least one of another instance of the file tiering operation and another file tiering operation.

7. The apparatus of claim 1 wherein said at least one processing platform is further configured to request the second hash value from a callback daemon.

8. The apparatus of claim 7 wherein the request comprises:

a read request for the data in the object on the destination storage location; and an object identifier indicating that the request corresponds to a data integrity check.

9. The apparatus of claim 7 wherein the callback daemon reads the data in the object from the destination storage location and computes the second hash value.

10. The apparatus of claim 1 wherein said at least one processing platform is further configured: to store the first hash value in a database; and to delete the first hash value from the database following the determining of whether the first hash value is the same as the second hash value.

11. The apparatus of claim 1 wherein: the destination storage location comprises a cloud storage platform; and said at least one processing platform comprises a cloud tiering appliance.

12. A method comprising:

computing, by executing one or more hashing algorithms, a first hash value for at least one file of a plurality of files to be tiered in connection with a file tiering operation of the plurality of files from a source storage location to a destination storage location, wherein computing the first hash value comprises computing a plurality of intermediate hash values for a plurality of data chunks of the at least one file, wherein the file tiering operation comprises writing the plurality of data chunks of the at least one file to an object on the destination storage location in response to computing the plurality of intermediate hash values;

comparing the first hash value to a second hash value for the at least one file, wherein the second hash value is computed from data in the object on the destination storage location corresponding to the at least one file;

determining, based at least in part on the comparing, whether the first hash value is the same as the second hash value, wherein the first hash value and the second hash value are determined to be the same when the first hash value and the second hash value match; and proceeding with tiering of the at least one file in response to an affirmative determination;

wherein the method is performed by at least one processing platform comprising at least one processing device comprising a processor coupled to a memory.

13. The method of claim 12 further comprising discontinuing the tiering of the at least one file in response to a negative determination.

14. The method of claim 12 further comprising requesting the second hash value from a callback daemon.

15. A computer program product comprising a non-transitory processor-readable storage medium having stored therein program code of one or more software programs, wherein the program code when executed by at least one processing platform causes said at least one processing platform:

to compute, by executing one or more hashing algorithms, a first hash value for at least one file of a plurality of files to be tiered in connection with a file tiering operation of the plurality of files from a source storage location to a destination storage location, wherein computing the first hash value comprises computing a plurality of intermediate hash values for a plurality of data chunks of the at least one file, wherein the file tiering operation comprises writing the plurality of data chunks of the at least one file to an object on the destination storage location in response to computing the plurality of intermediate hash values;

to compare the first hash value to a second hash value for the at least one file, wherein the second hash value is computed from data in the object on the destination storage location corresponding to the at least one file;

to determine, based at least in part on the comparing, whether the first hash value is the same as the second hash value, wherein the first hash value and the second hash value are determined to be the same when the first hash value and the second hash value match; and to proceed with tiering of the at least one file in response to an affirmative determination.

16. The computer program product of claim 15 wherein the program code further causes said at least one processing platform to request the second hash value from a callback daemon.

17. The apparatus of claim 1 wherein said at least one processing platform is further configured:

in response to the affirmative determination, to cause generation of a stub file on the source storage location, wherein the stub file comprises an object identifier that indicates a location of the object on the destination storage location.

18. The apparatus of claim 1 wherein the plurality of files is selected to be tiered based on one or more file tiering constraints.

19. The apparatus of claim 18 wherein the one or more file tiering constraints comprise at least one of:

a time when a file was last accessed or modified;

a time when file attributes were last changed;

a size of a file;

a file name; and a directory name.

20. The computer program product of claim 15 wherein the plurality of files is selected to be tiered based on one or more file tiering constraints.

* * * * *